United States Patent
Lee

(10) Patent No.: US 6,953,019 B2
(45) Date of Patent: Oct. 11, 2005

(54) OIL FILTER ASSEMBLY FOR AN INTERNAL COMBUSTION ENGINE

(75) Inventor: Su Ho Lee, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/747,002

(22) Filed: Dec. 23, 2003

(65) Prior Publication Data

US 2005/0072396 A1 Apr. 7, 2005

(30) Foreign Application Priority Data

Oct. 1, 2003 (KR) .............................. 10-2003-0068377

(51) Int. Cl.[7] .............................................. F01M 11/03
(52) U.S. Cl. .................................................. 123/196 R
(58) Field of Search ......................... 123/196 A, 196 S, 123/196 R, 196 AB; 210/168, 184, 429, 248; 184/6.24

(56) References Cited

U.S. PATENT DOCUMENTS 4,036,755 A * 7/1977 Dahm et al. ................ 210/168
4,906,365 A * 3/1990 Baumann et al. ........... 210/238
5,483,928 A * 1/1996 Mahlberg et al. ......... 123/41.42

FOREIGN PATENT DOCUMENTS

| JP | 11104410 A | * 4/1999 | ........... B01D/27/10 |
| JP | 11137917 | 5/1999 | |
| JP | 2000288317 A | * 10/2000 | ........... B01D/35/02 |

* cited by examiner

Primary Examiner—Henry C. Yuen
Assistant Examiner—Hyder Ali
(74) Attorney, Agent, or Firm—Morgan Lewis & Bockius LLP

(57) ABSTRACT

An oil filter assembly includes a filter housing, an oil filter unit, and a drain valve unit. The filter housing is provided with an oil inflow passageway through which oil is supplied into the filter housing from an oil pan, an oil exhaust passageway communicating with a main oil gallery, and an oil drain passageway through which oil is drained to the oil pan. The oil filter unit is disposed within the filter housing to filter the oil flowing into the filter housing. The drain valve unit is configured to selectively close the oil exhaust passageway and the oil drain passageway in response to whether the oil filter unit is disposed within the filter housing or whether the oil filter is removed from the filter housing.

4 Claims, 2 Drawing Sheets

US 6,953,019 B2

OIL FILTER ASSEMBLY FOR AN INTERNAL COMBUSTION ENGINE

CROSS-REFERENCE TO RELATED APPLICATIONS

This application claims priority of Korean Application No. 10-2003-0068377, filed on Oct. 1, 2003, the disclosure of which is incorporated fully herein by reference.

FIELD OF THE INVENTION

The present invention relates to a lubrication system for an internal combustion engine, and more particularly, to an oil filter assembly.

BACKGROUND OF THE INVENTION

Generally, an internal combustion engine is provided with a lubrication system for lubricating and cooling, and the lubrication system circulates oil through various parts of the engine. While oil circulates in the engine, it gathers impurities. To remove such impurities, an oil filter assembly is provided within the lubrication system.

A convention oil filter assembly includes a filter housing and an oil filter that is disposed within the filter housing. If too many impurities are accumulated in the oil filter, the oil filter cannot operate normally. Therefore, the oil filter must be exchanged.

Generally, the filter housing is configured to drain oil existing therein to an oil pan when the oil filter is being exchanged. An oil exhaust passageway communicating with a main oil gallery is formed in a lower portion of the filter housing, and an oil drain hole is branched from the oil exhaust passageway. The oil drain hole communicates with the oil pan.

In a state that the oil filter is mounted, a lower portion of a filter stand that supports the oil filter is inserted into the oil drain hole, and a sealing ring is coupled to an outer circumference of the filter stand, so that the oil drain hole is closed.

The oil filter stand is also exchanged when the oil filter is exchanged. Therefore, when the oil filter is removed from the filter housing, the oil drain hole is opened, so that oil in the oil filter housing moves into the oil pan through the oil drain hole.

At this time, oil also flows into the main oil gallery through the oil exhaust passageway. Therefore, unfiltered oil flows into the engine. That is, while the oil filter is exchanged, unfiltered oil may flow into the main oil gallery, and this can cause engine troubles.

Furthermore, the filter stand must be extended to the oil drain hole in order to close the oil drain hole when the oil filter is mounted. Therefore, the filter stand is long so that there are difficulties in mounting the oil filter.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide an oil filter assembly in which unfiltered oil is prevented from flowing to a main gallery while an oil filter is being exchanged.

In a preferred embodiment of the present invention, the oil filter assembly comprises a filter housing, an oil filter unit, and a drain valve unit. The filter housing is provided with an oil inflow passageway through which oil is supplied into the filter housing from an oil pan, an oil exhaust passageway communicating with a main oil gallery, and an oil drain passageway through which oil is drained to the oil pan. The oil filter unit is disposed within the filter housing to filter the oil flowing into the filter housing. The drain valve unit is configured to selectively close the oil exhaust passageway and the oil drain passageway in response to whether the oil filter unit is disposed within the filter housing or whether the oil filter is removed from the filter housing.

It is preferable that the drain valve unit opens the oil exhaust passageway and closes the oil drain passageway when the oil filter unit is disposed within the filter housing, and wherein the drain valve unit closes the oil exhaust passageway and opens the oil drain passageway when the oil filter unit is removed from the filter housing.

Preferably, the drain valve unit comprises a valve housing, a plunger, and an elastic member. The valve housing is disposed in the oil exhaust passageway and in the oil drain passageway, and it is provided with a first through hole communicating with the oil exhaust passageway and a second through hole communicating with the oil drain passageway. The plunger is slidably disposed within the valve housing, and it is able to move between a first position where the plunger closes the first through hole and a second position where the plunger closes the second through hole. The elastic member elastically supports the plunger against the valve housing. The oil filter unit comprises a filter stand disposed within the filter housing and an oil filter fixedly coupled to the filter stand. The filter stand presses the plunger such that the plunger is positioned to a first position where the plunger closes the second through hole when the filter unit is disposed within the filter housing, and the elastic member urges the plunger such that the plunger is positioned to a second position where the plunger closes the first through hole when the filter unit is removed from the filter housing.

It is preferable that the elastic member is a coil spring.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
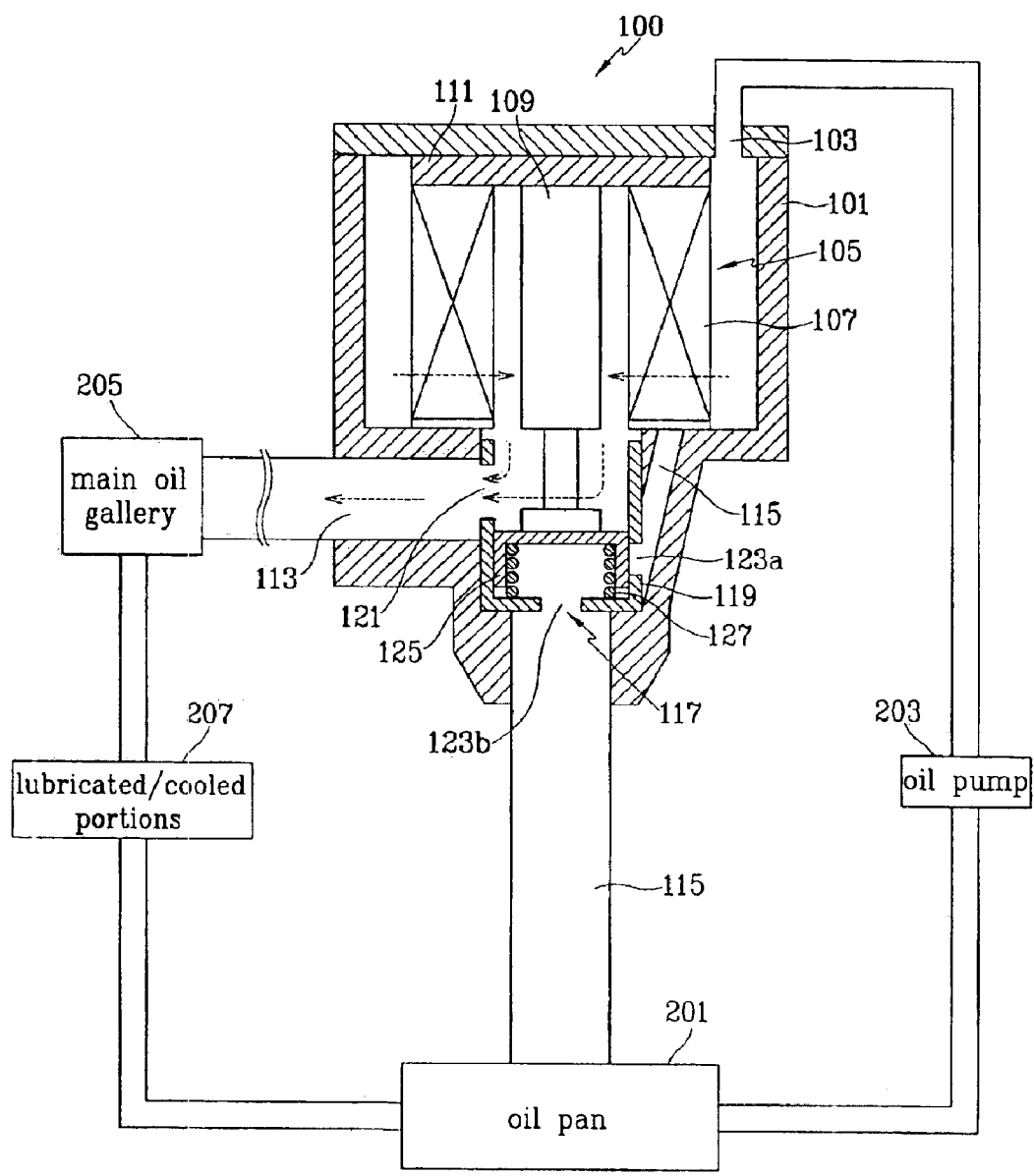
FIG. 1 schematically shows the oil filter assembly according to an embodiment of the present invention.

Oil filter assembly 100 according to an embodiment of the present is a device for filtering oil of an internal combustion engine. As shown in FIG. 1, oil stored in an oil pan 201 is supplied to an oil filter housing 101 of the oil filter assembly 100 by an operation of an oil pump 203. The oil supplied from the oil pan 201 enters the housing 101 through an oil inflow passageway 103.

An oil filter unit 105 is disposed within the oil filter housing 101, and the oil filter unit 105 filters the oil flowing into the oil filter housing 101. The oil filter unit 105 is disposed within the oil filter housing 101 such that the oil filter unit 105 can be separated from the oil filter housing 101. The oil filter unit 105 comprises an oil filter 107 and a filter stand 109 to which the oil filter 107 is coupled. As an example, the oil filter 107 can be coupled to the filter stand by a coupling member 111. The oil filter 107 can be a conventional oil filter. It is preferable that the filter stand 109 has a shape of a pillar extending in a vertical direction.

Oil is filtered by the oil filter 107, and the filtered oil is exhausted from the filter housing 101. Then, the oil flows into a main oil gallery 205 through an oil exhaust passageway 113. The oil supplied to the main oil gallery 205 passes through various lubricated/cooled portions 207 and enters the oil pan 201.

An oil drain passageway 115 is formed in the oil filter housing 101. The oil drain passageway 115 communicates with the oil pan 201. The oil drain passageway 115 is formed in a lower portion of the oil filter housing 101, so that the oil can be drained to the oil pan 201 through the oil drain passageway 115 when the oil filter unit 105 is removed.

The oil filter assembly 100 according to a preferred embodiment of the present invention has a drain valve unit 117 that is configured to selectively close the oil exhaust passageway 113 and the oil drain passageway 115 in response to a mounting or a dismounting of the oil filter unit 105.

Figure 2:
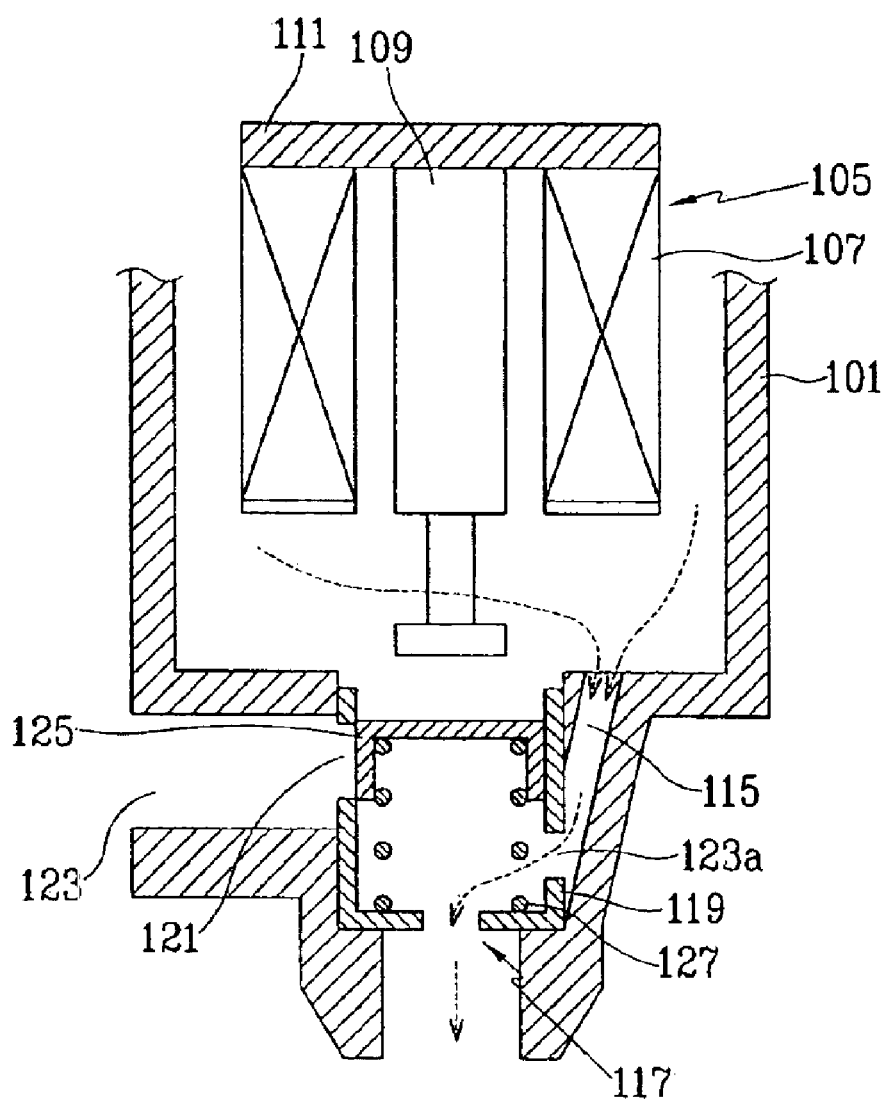
FIG. 2 shows a state in which the oil filter unit is removed.

As shown in FIG. 1, while the oil filter unit 105 is mounted, the drain valve unit 117 operates such that the oil exhaust passageway 113 is opened and the oil drain passageway 115 is closed. On the other hand, as shown in FIG. 2, while the oil filter unit 105 is dismounted (removed), the drain valve unit 117 operates such that the oil exhaust passageway 113 is closed and the oil drain passageway 115 is opened.

Therefore, in a state that the oil filter unit 105 is mounted, the oil passing through the oil filter 107 flows into the main oil gallery 205, and in a state that the oil filter 105 is dismounted, the oil does not flow into the main oil gallery 205 but is drained to the oil pan 201.

The drain valve unit 117 includes a valve housing 119 that is disposed simultaneously in the oil exhaust passageway 113 and the oil drain passageway 115. The valve housing 119 has a cylindrical shape, and an upper end thereof is opened to communicate with an inside portion of the oil filter 107. The valve housing 119 is disposed in the oil filter housing 101.

A first through hole 121 communicating with the oil exhaust passageway 113 is formed in the valve housing 119, and second through holes 123a and 123b communicating with the oil drain passageway 115 are formed in the valve housing 119. A plunger 125 is vertically slidably disposed in the valve housing 119. The plunger 125 has a cylindrical shape, and a lower end thereof is opened.

A coil spring 127 is disposed between the valve housing 119 and the coil spring 127. That is, the plunger is elastically supported by the coil spring against the valve housing 119. Instead of the coil spring 127, any arbitrary elastic member can be used which can elastically support the plunger 125. The coil spring 127 vertically upwardly supports the plunger 125 against the valve housing 119.

As shown in FIG. 1, while the oil filter unit 105 is mounted, the filter stand 109 presses the plunger 125 downwardly, and the coil spring 127 is thereby compressed. Consequently, the plunger 125 is positioned at its lowest position where the plunger 125 closes the second through hole 123a. At this time, the first through hole 121 is opened. Therefore, the oil flows in a dotted arrow direction in FIG. 1.

On the other hand, in a state such that the oil filter unit 105 is dismounted, as shown in FIG. 2, the plunger 125 is upwardly biased by the coil spring 127. Consequently, the plunger 125 is positioned at its highest position where the plunger 125 closes the first through hole 121. At this time, the second through holes 123a and 123b are opened.

Therefore, while the oil filter unit 105 is being exchanged, the unfiltered oil is prevented from flowing to the main oil gallery 125 and is allowed to flow to the oil pan 201 through the oil drain passageway 115. Therefore, when the oil filter unit 105 is dismounted, the oil flows in a dotted arrow direction of FIG. 2.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

According to the oil filter assembly according to the embodiment of the present invention, unfiltered oil is prevented from flowing to the main oil gallery while the oil filter unit is dismounted.

What is claimed is:

1. An oil filter assembly, comprising:

a filter housing with an oil inflow passageway through which oil is supplied into the filter housing from an oil pan, an oil exhaust passageway communicating with a main oil gallery, and an oil drain passageway through which oil is drained to the oil pan;

an oil filter unit disposed within the filter housing to filter the oil flowing into the filter housing; and a drain valve unit being configured to selectively close the oil exhaust passageway and the oil drain passageway in response to whether the oil filter unit is disposed within the filter housing or whether the oil filter is removed from the filter housing, wherein the drain valve unit comprises:

a valve housing disposed in the oil exhaust passageway and in the oil drain passageway, the valve housing being provided with a first through hole communicating with the oil exhaust passageway and a second through hole communicating with the oil drain passageway;

a plunger slidably disposed within the valve housing, the plunger being able to move between a first position where the plunger closes the first through hole and a second position where the plunger closes the second through hole; and an elastic member elastically supporting the plunger against the valve housing, wherein the oil filter unit comprises:

a filter stand disposed within the filter housing; and an oil filter fixedly coupled to the filter stand, wherein the filter stand presses the plunger such that the plunger is positioned to a first position where the plunger closes the second through hole when the filter unit is disposed within the filter housing, and wherein the elastic member urges the plunger such that the plunger is positioned to a second position where the plunger closes the first through hole when the filter unit is removed from the filter housing.

2. The oil filter assembly of claim 1, wherein the drain valve unit opens the oil exhaust passageway and closes the oil drain passageway when the oil filter unit is disposed within the filter housing, and wherein the drain valve unit closes the oil exhaust passageway and opens the oil drain passageway when the oil filter unit is removed from the filter housing.

3. The oil filter assembly of claim 1, wherein the elastic member is a coil spring.

4. An oil filter assembly, comprising:

a filter housing defining an oil inflow passageway through which oil may be supplied to the filter housing from an oil pan, an oil exhaust passageway configured to communicate with a main oil gallery, and an oil drain passageway through which oil may be drained to the oil pan, said filter housing being configured and dimensioned to receive an oil filter unit therein; and a drain valve unit configured to close said oil drain passageway when the oil filter unit is received in said filter housing and selectively open said oil drain passageway and close said oil exhaust passageway in response to removal of the oil filter unit from said filter housing, wherein the drain valve unit comprises:

a valve housing disposed in the oil exhaust passageway and in the oil drain passageway, the valve housing being provided with a first through hole communicating with the oil exhaust passageway and a second through hole communicating with the oil drain passageway;

a plunger slidably disposed within the valve housing, the plunger being able to move between a first position where the plunger closes the first through hole and a second position where the plunger closes the second through hole; and an elastic member elastically supporting the plunger against the valve housing, wherein the oil filter unit comprises:

a filter stand disposed within the filter housing; and an oil filter fixedly coupled to the filter stand, wherein the filter stand presses the plunger such that the plunger is positioned to a first position where the plunger closes the second through hole when the filter unit is disposed within the filter housing, and wherein the elastic member urges the plunger such that the plunger is positioned to a second position where the plunger closes the first through hole when the filter unit is removed from the filter housing.

* * * * *